(12) United States Patent
Ishizaki

(10) Patent No.: US 8,849,726 B2
(45) Date of Patent: Sep. 30, 2014

(54) INFORMATION PROCESSING APPARATUS AND CONTROL METHOD FOR THE SAME

(75) Inventor: Tooru Ishizaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 12/971,237

(22) Filed: Dec. 17, 2010

(65) Prior Publication Data

US 2011/0153531 A1 Jun. 23, 2011

(30) Foreign Application Priority Data

Dec. 18, 2009 (JP) ................................. 2009-288418

(51) Int. Cl.
*G06F 15/18* (2006.01)
*G06F 17/22* (2006.01)

(52) U.S. Cl.
CPC ........ *G06F 17/2258* (2013.01); *G06F 17/2252* (2013.01); *G06F 17/2247* (2013.01)
USPC .......................................................... 706/12

(58) Field of Classification Search
None
See application file for complete search history.

(56) References Cited

U.S. PATENT DOCUMENTS

| 5,258,983 | A | * | 11/1993 | Lane et al. ..................... 370/477 |
| 7,970,082 | B2 | | 6/2011 | Gunturi et al. ................ 707/809 |
| 8,090,731 | B2 | * | 1/2012 | Sthanikam et al. ........... 707/756 |
| 2004/0003343 | A1 | * | 1/2004 | Liao et al. ................... 715/501.1 |
| 2006/0085737 | A1 | * | 4/2006 | Liu ................................ 715/513 |
| 2009/0083298 | A1 | | 3/2009 | Ishizaki ........................ 707/101 |
| 2009/0083315 | A1 | | 3/2009 | Ishizaki et al. ............. 707/103 R |
| 2010/0010995 | A1 | * | 1/2010 | Fablet et al. ...................... 707/6 |
| 2010/0211867 | A1 | * | 8/2010 | Heuer et al. .................. 715/234 |

FOREIGN PATENT DOCUMENTS

JP 2008-140179 A 6/2008

OTHER PUBLICATIONS

International Standard ISO/IEC 24824-1:2005(E), Information technology—Generic applications of ASN.1: Fast infoset, 2005.
J. Schneider and T. Kamiya, Eds., << W3C Efficient XML Interchange (EXI) Format 1.0 >> W3C Candidate Recommendation, <http://www.w3.org/TR/exi/> Dec. 8, 2009, pp. 1-126.

* cited by examiner

*Primary Examiner* — Kakali Chaki
*Assistant Examiner* — Eric Nilsson
(74) *Attorney, Agent, or Firm* — Fitzpatrick, Cella, Harper & Scinto

(57) ABSTRACT

An information processing apparatus that encodes input structured data according to an encoding rule is provided. When the structured data matches a specified learning target, this apparatus determines the start of learning of the encoding rule. Upon determining the start of learning, the apparatus recognizes the structure and data type of the structured data and starts learning the encoding rule. The apparatus stores the structured data until an end condition corresponding to the specified learning target holds and the end of learning of the encoding rule is determined. Upon determining the end of learning, the apparatus encodes the stored structured data according to the learned encoding rule.

10 Claims, 13 Drawing Sheets

F I G. 1
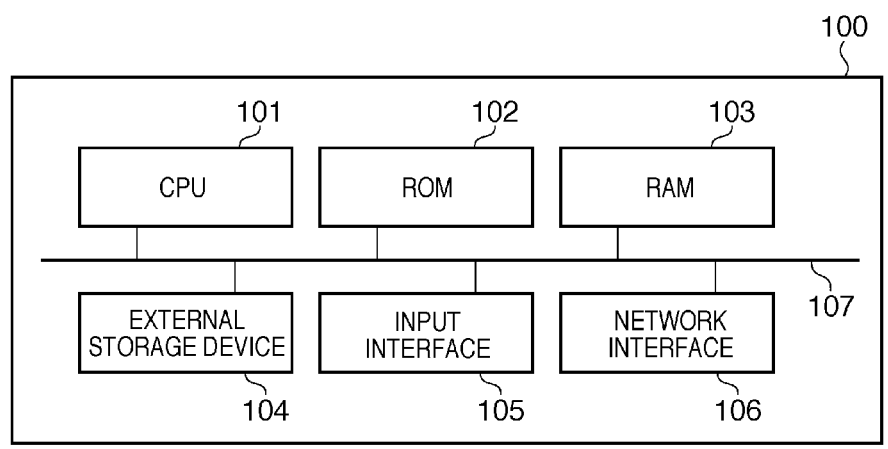

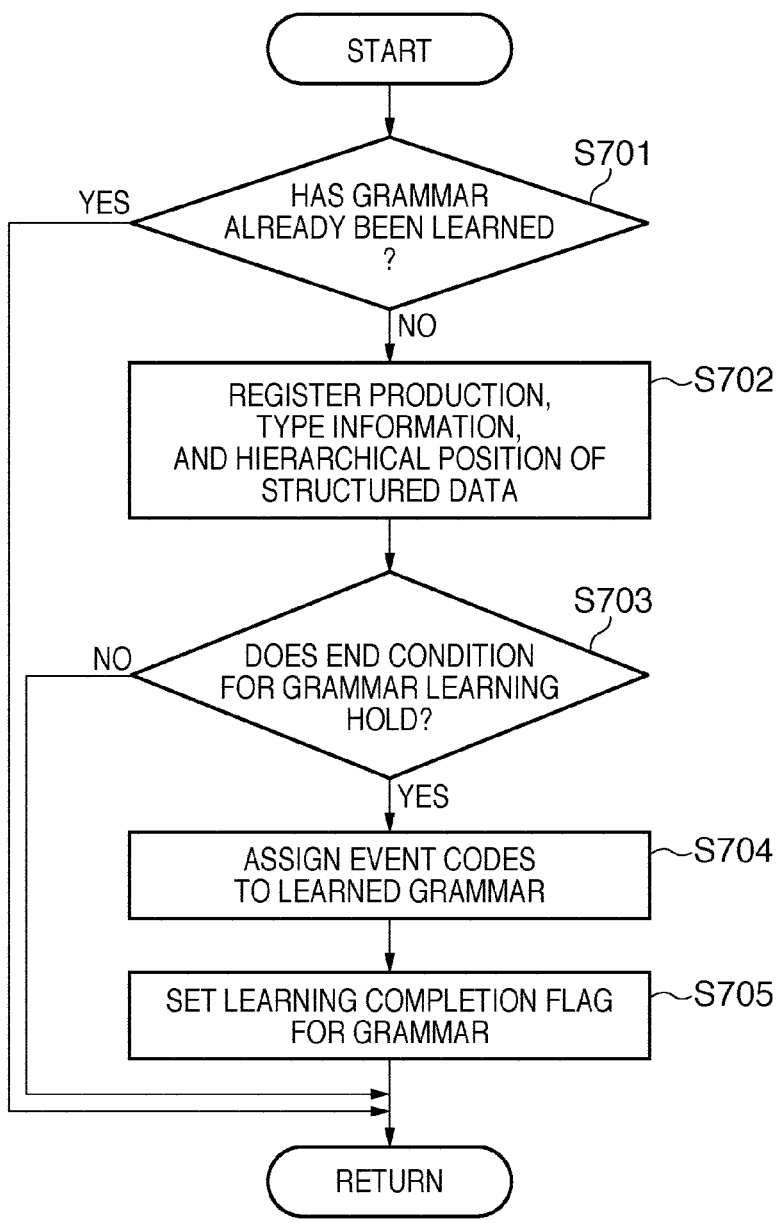

FIG. 8

```
<xsd:schema
xmlns:xsd="http://www.w3.org/2001/XMLSchema">
<xsd:element name="Path" type="pathtype"/>
<xsd:complexType name="pathtype">
<xsd:element name="M" type="mtype"/>
</xsd:complexType>
<xsd:complex Type name="mtype">
<xsd:attribute name="x" type="xsd:double"/>
<xsd:attribute name="y" type="xsd:double"/>
</xsd:complexType>
</xsd:schema>
```

XML SCHEMA CREATED FROM LEARNED GRAMMAR

XML DATA

DESIGN SAMPLE 1

| | | COUNTER |
|---|---|---|
| ○ | <path>, <m> | 2 |
| ◇ | <path>, <m> | 2 |
| ╱ | <path>, <l> | 2 |
| A | <text> | 1 |

INFORMATION PROCESSING APPARATUS AND CONTROL METHOD FOR THE SAME

BACKGROUND OF THE INVENTION

1. Field of the Invention

The present invention relates to a technique for creating an encoded document.

2. Description of the Related Art

In general, XML encodes all data by using a character-encoding scheme such as UTF-8 or UTF-16. In this case, the encoded data has redundancy and increases in data size as compared with the original information amount. In contrast to this, Fast Infoset (ISO/IEC 24824-1: 2007 Information technology—Generic applications of ASN.1: Fast Infoset) as an ISO/IEC standard, which is a binary XML technique, reduces the redundancy and data size of data by encoding integers, floating-point numbers, and the like by using an encoding schemes corresponding to the data types. However, Fast Infoset needs to describe the identifier of the encoding scheme for each data in encoded data, and hence requires a data size that corresponds to each identifier. In contrast, W3C EXI (Efficient XML Interchange (EXI) Format 1.0), which is also a binary XL technique, acquires the data type information of each data from an XML schema. This eliminates the necessity to describe the identifier of each encoding scheme in encoded data, and hence achieves a further reduction in data size.

In order to encode data using EXI according to the data type, an encoding rule must be created before the schema of a document or a partial schema. A schema defines the overall grammar of XML data, and includes descriptions irrelevant to each XML data. To create an encoding rule from a schema, therefore, much processing time and a large memory size are required.

SUMMARY OF THE INVENTION

The present invention implements the creation of an encoding rule more efficiently than the conventional technique of creating an encoding rule from a schema.

According to one aspect of the present invention, an information processing apparatus which encodes input structured data according to an encoding rule is provided. The apparatus comprises a specifying unit configured to specify a learning target for the encoding rule, a start determination unit configured to determine a start of learning of the encoding rule when the input structured data matches a learning target specified by the specifying unit, a learning unit configured to learn the encoding rule by recognizing a structure and data type of the structured data when the start determination unit determines a start of learning, an end determination unit configured to determine an end of learning of the encoding rule when an end condition corresponding to a learning target specified by the specifying unit holds for the input structured data, a storage unit configured to store the structured data until the end determination unit determines an end of learning, and an encoding unit configured to encode the structured data stored in the storage unit according to the encoding rule learned by the learning unit when the end determination unit determines an end of learning.

Further features of the present invention will become apparent from the following description of exemplary embodiments (with reference to the attached drawings).

BRIEF DESCRIPTION OF THE DRAWINGS

FIG. 1 is a block diagram showing the arrangement of an information processing apparatus according to an embodiment;

FIG. 7 is a flowchart showing the operation of the information processing apparatus according to the embodiment;

FIG. 8 is a view showing an example of an XML schema according to the embodiment;

DESCRIPTION OF THE EMBODIMENTS

Figure 2:
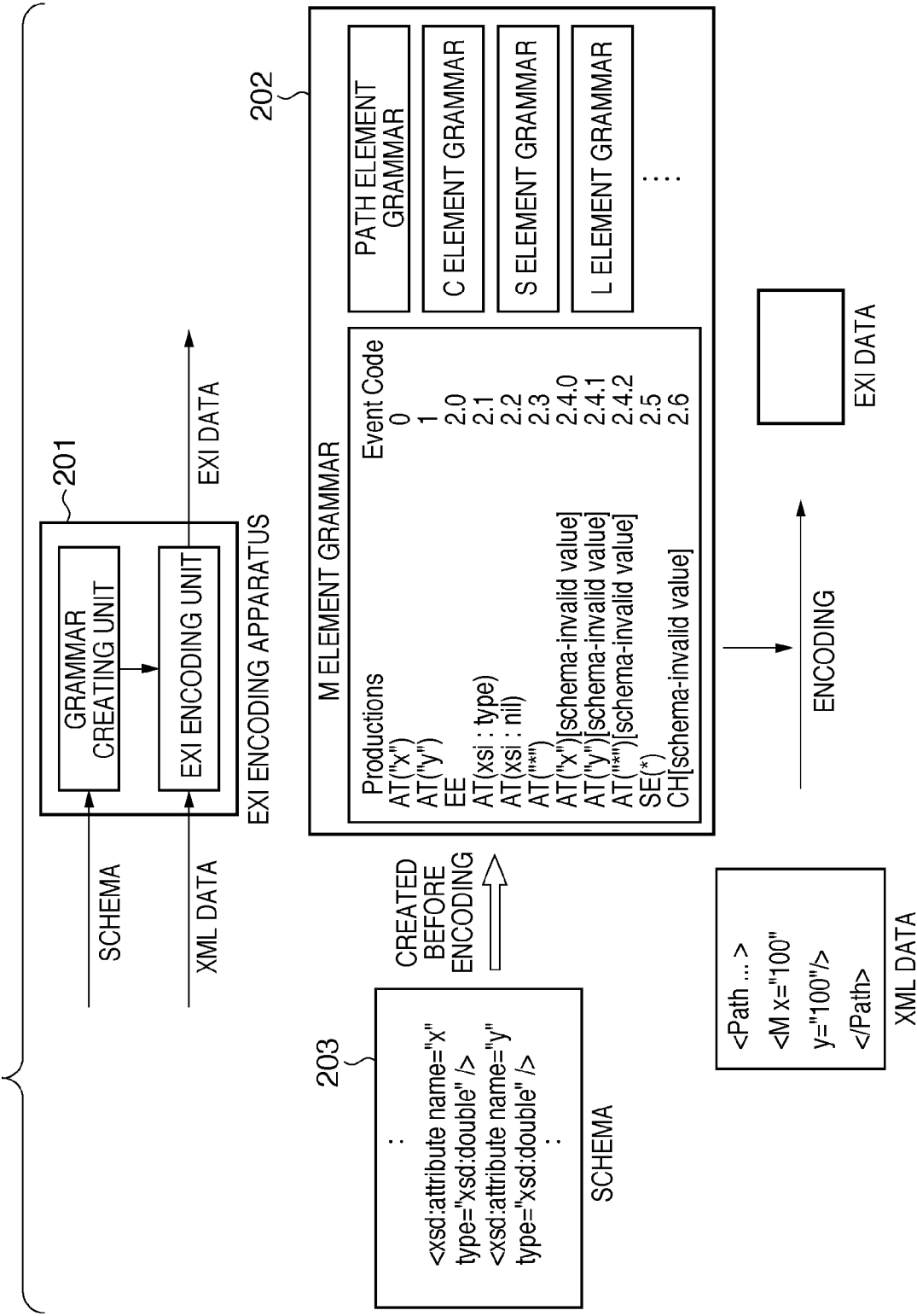
FIG. 2 is a view showing an example of data processed by the information processing apparatus according to the embodiment.

The preferred embodiments of the present invention will be described in detail below with reference to the accompanying drawings. Note that the present invention is not limited to the embodiments described below, which are merely concrete examples advantageous to the implementation of the present invention.

First Embodiment

The arrangement of an information processing apparatus according to this embodiment will be described with reference to the block diagram of FIG. 1. An information processing apparatus according to this embodiment can be implemented by a single computer apparatus or can be implemented by distributing functions to a plurality of computer apparatuses. When the information processing apparatus is to be constituted by a plurality of computer apparatuses, they can be connected to each other via a local area network (LAN) or the like so as to allow them to communicate with each other.

Referring to FIG. 1, reference numeral 101 denotes a central processing unit (CPU) to control an overall information processing apparatus 100; 102, a read only memory (ROM) to store permanent programs and parameters; 103, a random access memory (RAM) to temporarily store programs and data supplied from external apparatuses and the like; and 104, an external storage device fixedly mounted in the information processing apparatus 100. The external storage device includes, for example, a hard disk, a memory card, a flexible disk (FD), an optical disk such as a compact disk (CD), a magnetic card, an optical card, and an IC card. Reference numeral 105 denotes an interface for input devices such as a pointing device and a keyboard to input data upon receiving user's operation; 106, a network interface for connection to a network such as Internet; and 107, a system bus to connect the units 101 to 106 so as to allow them to communicate with each other.

This embodiment will exemplify a case in which the present invention is applied to XML data in which drawing data is described. Many numeric data such as coordinate information are described in drawing data. Encoding numeric data into numeric type data instead of character type data will facilitate computer processing and lead to a smaller data size. Encoding binary XML can encode numeric data into numeric type data. FIG. 2 shows an example of XML data in which drawing data is described, which is used in this embodiment. The XML data has numeric data "100" described as each of x and y attributes representing coordinate information.

Described first is an example of encoding XML data in FIG. 2 into data based on EXI (Efficient XML Interchange), which is binary XML as a W3C standard. This apparatus encodes schema data into EXI data by using a set of productions called a grammar denoted by reference numeral 202 as an encoding rule. If, for example, XML data is a start element, the apparatus searches the grammar for production "SE(*)", and encodes it into event code "2.5". If the data is an end element, the apparatus searches the grammar for production "EE", and encodes it into event code "2.0".

When encoding data into numeric type data in EXI, the apparatus uses an encoding option called schema informed. As shown in FIG. 2, schema informed creates the grammar 202 from an XML schema 203 as an encoding target before encoding. EXI lets the schema side have data type information to reduce the size of encoded data.

Reference numeral 201 denotes a functional block diagram associated with EXI encoding. The EXI encoding apparatus includes a grammar creating unit to create a grammar from a schema and an EXI encoding unit to encode XML data into EXI data by using the created grammar.

Figure 3:
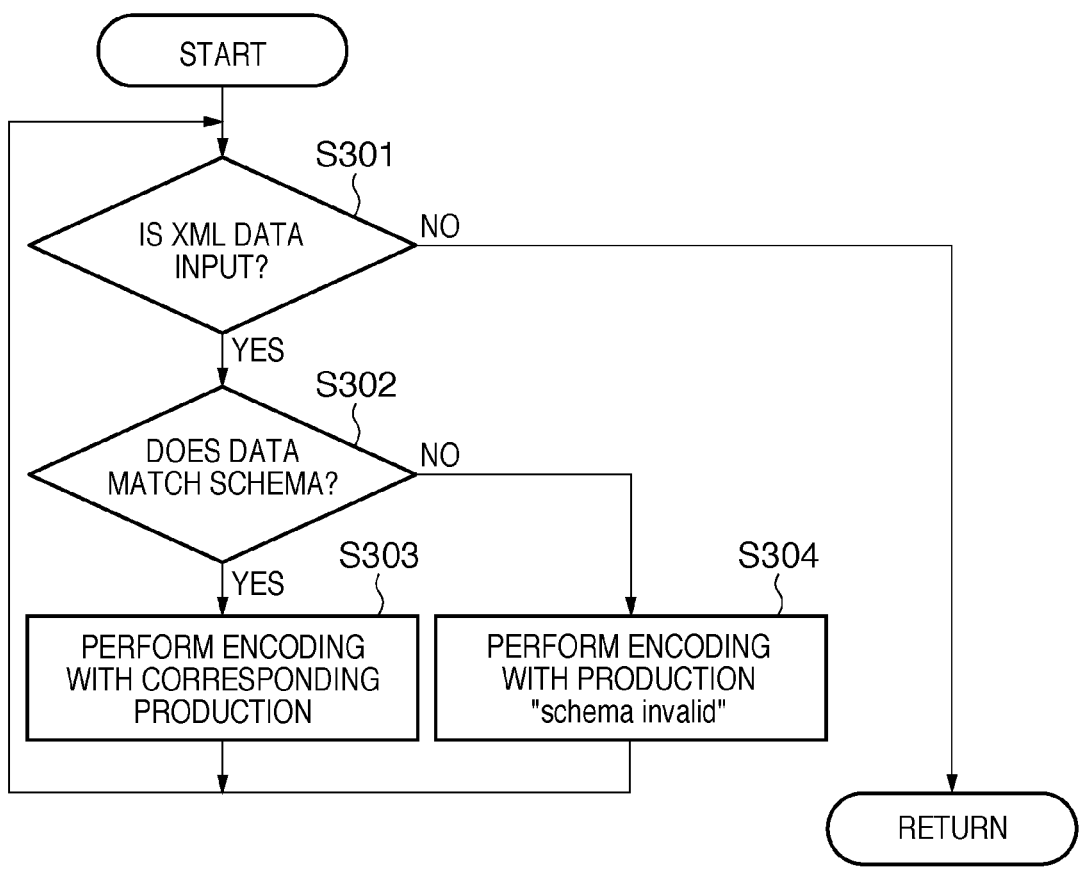
FIG. 3 is a flowchart showing the operation of the information processing apparatus according to the embodiment.

FIG. 3 is a flowchart showing EXI encoding processing by schema informed. First of all, in step S301, schema informed accepts a divided input of XML data. In step S302, schema informed determines whether the input XML data is valid for the schema. If schema informed determines that the data is valid, schema informed encodes the data by using a corresponding production in step S303. If schema informed determines that the data is invalid, schema informed encodes the data by using a schema-invalid production in step S304.

The XML data in FIG. 2 is input with the value of the x attribute being 100. This value is input as a double type value which is a floating-point number to indicate that the data is other than character data. According to EXI schema informed, in order to efficiently encode data, the data needs to be input in a type matching the schema. When the data is input as double type data, since the data matches the schema, schema informed encodes the data into 100 as double type data with event code "0" by using production "AT("x")". Assume that the data is input as integer type data. In this case, since the data does not match the schema, schema informed encodes the data into 100 as character type data with event code "2.4.0" by using production "AT("x") [schema-invalid-value]".

As is obvious from above, schema informed capable of performing encoding matching a data type needs to read a schema in advance and hold a generated grammar until the end of encoding. This leads to a high cost. In addition, since a schema is definition information, it is necessary to generate and hold grammars such as C, S, and L elements which are not included in the input XML data, as shown in FIG. 2. It may be possible to efficiently generate and hold grammars by parsing thoroughly the input XML data and then encoding the data into EXI data. However, applying the present invention to the XML data can efficiently create and hold grammars in real time without requiring the cost of parsing thoroughly the XML data.

Figure 4:
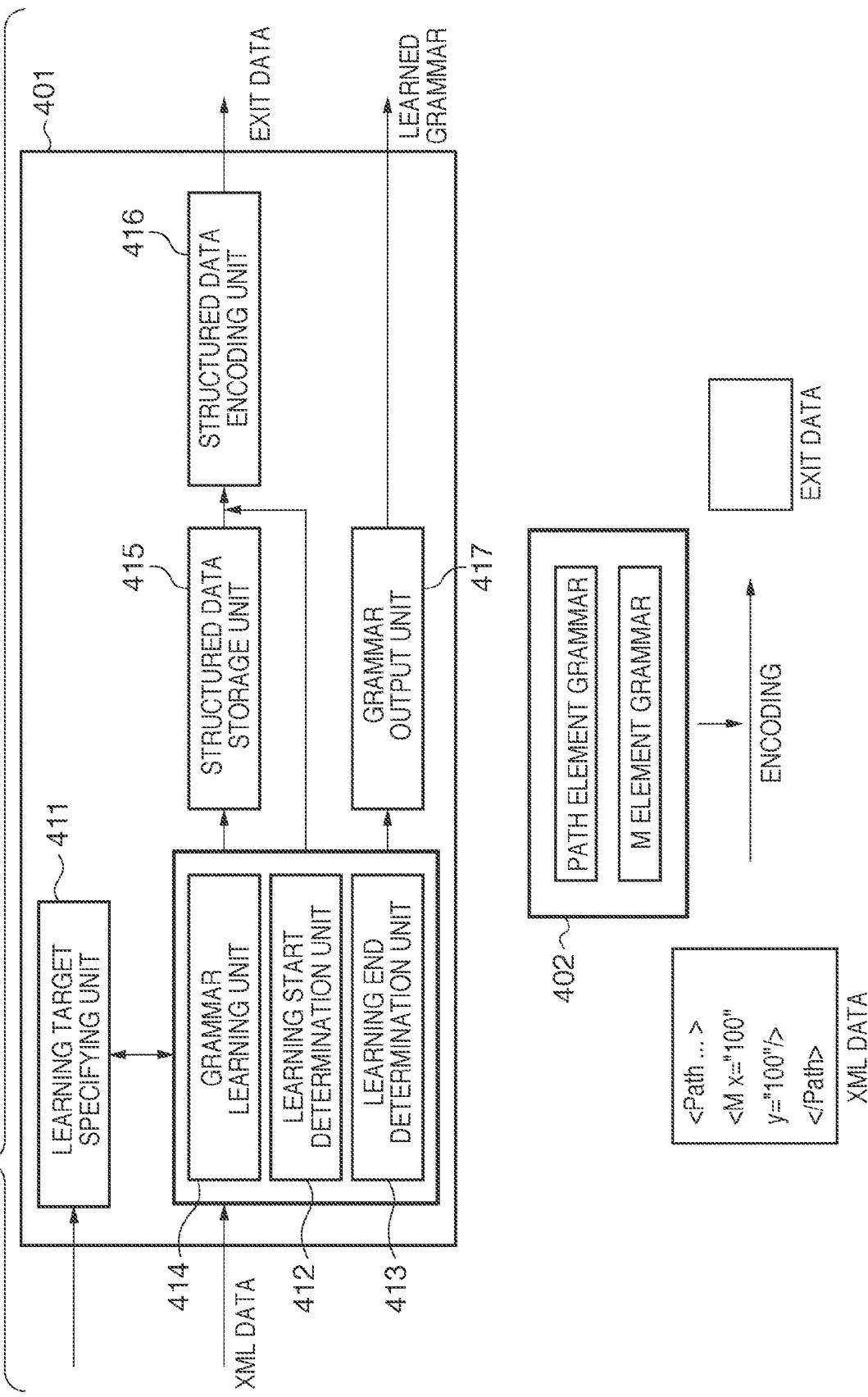
FIG. 4 is a view showing a functional arrangement associated with encoding processing performed by the information processing apparatus according to the embodiment and an example of data processed by the information processing apparatus.

FIG. 4 is a view for explaining a function associated with the processing of encoding data into EXI data according to this embodiment. The present invention creates no grammar from an XML schema as an encoding target before encoding. Instead, the present invention specifies learning targets for grammars. Learning in this case is learning of a portion created from a schema in the prior art unlike learning from the built-in grammar defined in EXI. It is possible to specify, as a learning target, an XML structure such as an element with a given name or an element included in a given predetermined section. This embodiment specifies a path element, M element, C element, S element, and L element as learning targets. Alternatively, in an environment with few memory resources, the data size of a grammar to be learned may be specified. Applying the present invention to this operation allows to hold only grammars 402.

Referring to FIG. 4, reference numeral 401 denotes a functional arrangement diagram associated with encoding processing by the information processing apparatus according to this embodiment. A learning target specifying unit 411 specifies a learning target for a grammar. A learning start determination unit 412 and a learning end determination unit 413 determine the start and end of learning for input data in accordance with learning target specifying operation. A grammar learning unit 414 learns a grammar. A structured data storage unit 415 temporarily stores input data during learning. A structured data encoding unit 416 encodes the input data by using the learned grammar. A grammar output unit 417 outputs the learned grammar after the end of learning.

Figure 5:
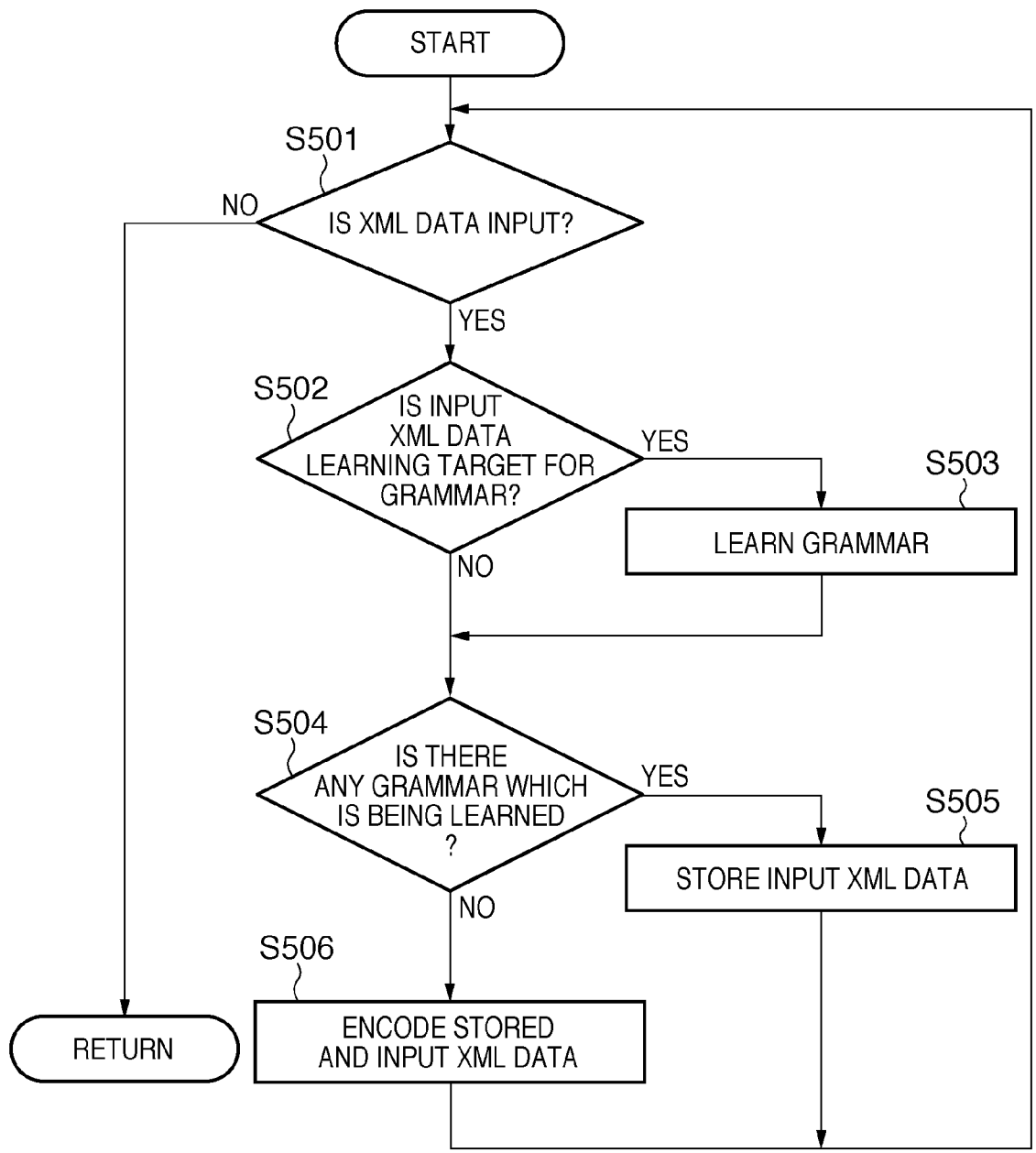
FIG. 5 is a flowchart showing the operation of the information processing apparatus according to the embodiment.

FIG. 5 is a flowchart showing the processing of encoding data into EXI data according to this embodiment. First of all, in step S501, this apparatus accepts a divided input of XML data. In step S502, the apparatus determines, in accordance with the conditions specified in advance, whether input structured data is a learning target for a grammar. In this embodiment, since a path element, M element, C element, S element, and L element are specified as learning targets, the apparatus determines whether the element name of the input structured data matches any one of the elements.

Upon determining in step S502 that the data is a learning target, the apparatus learns the grammar in step S503. FIG. 7 is a flowchart for learning. This operation will be described below with reference to the flowchart of FIG. 7. First of all, in step S701, the apparatus determines whether the grammar has already been learned. In this embodiment, the apparatus learns a portion created from a schema before encoding as in the prior art. To create encoded data conforming to EXI, it is necessary to keep using the same grammar once it is learned. If, therefore, the apparatus determines that the grammar has been learned, the process returns without performing learning.

Figure 6:
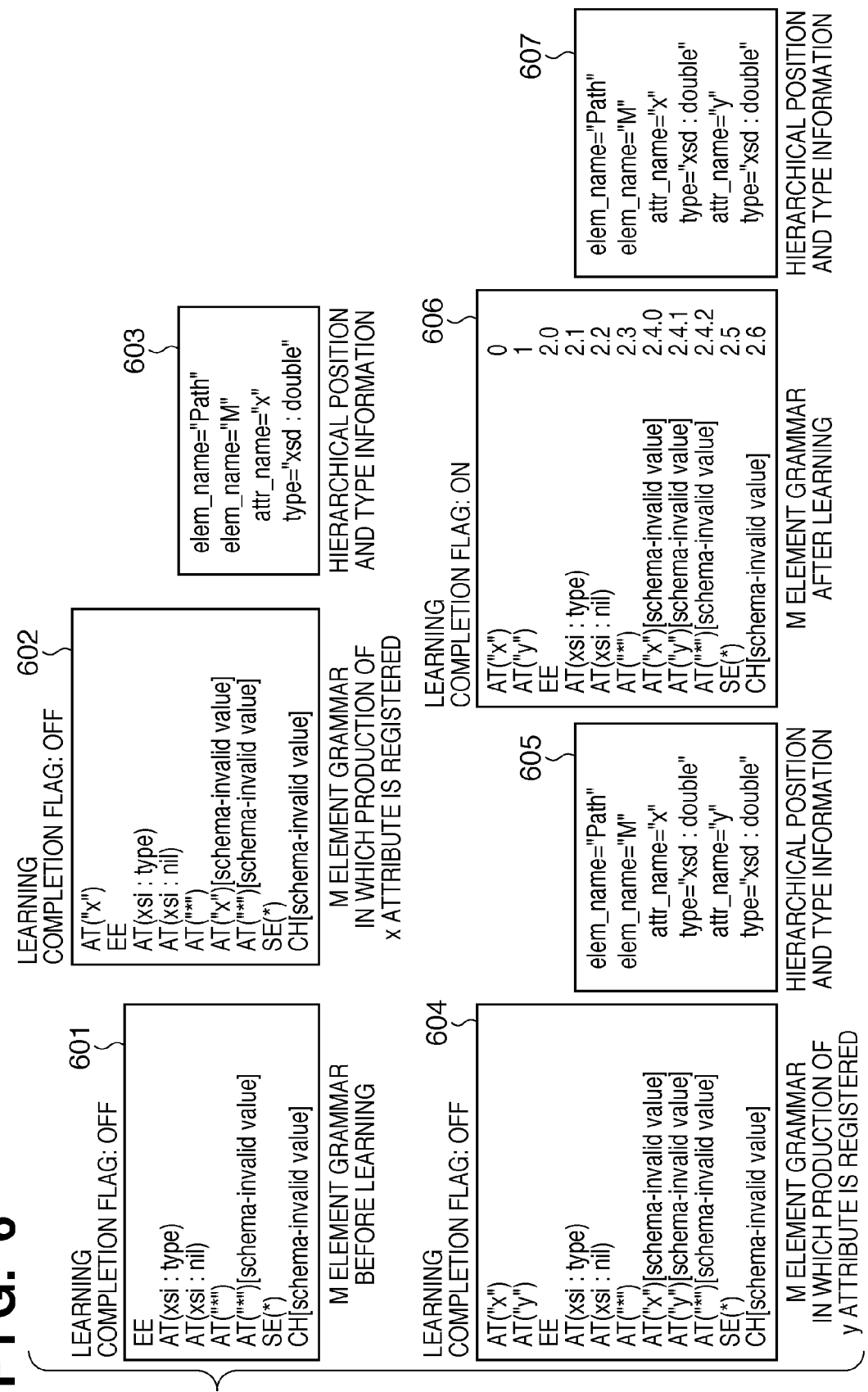
FIG. 6 is a view showing an example of data processed by the information processing apparatus according to the embodiment.

Upon determining in step S701 that a grammar has not been learned, the apparatus checks the structure and type of the input XML data, and registers the production, type information, and hierarchical position of the corresponding grammar in step S702. If a production has already been registered, the apparatus registers no production. In this embodiment, the apparatus inputs the value "100" as the value of the x attribute of the M element. The apparatus inputs the value as a double type value to indicate a floating-point number instead of a character. Since there is no production "AT("x")" corresponding to the M element grammar, the apparatus adds the production to a grammar 601 in FIG. 6 to create a grammar 602. Likewise, the apparatus inputs "100", which is a double type value, as the value of y attribute of the M element. The apparatus creates a grammar 604 by adding production "AT ("y")" to the grammar 602 in FIG. 6. As indicated by reference numerals 603 and 605 in FIG. 6, the apparatus records double type information as the type information of the values of the x attribute and y attribute. In this case, when a double type value is input as the value of the x attribute of the M element, since a production has already existed, the apparatus adds no production. When an integer type value is input as the value of the x attribute of the M element afterward, the schema regards this invalid. The schema then determines to use production "AT("x") {schema-invalid value}", and adds no production.

Although an interface may explicitly specify the type of XML data to be input, there is available a method of causing the encoding apparatus to recognize it. For example, using the reflection function in Java® makes it possible to estimate a type from an object of input XML data. In addition, it is possible to store an identifier indicating a type in the encoding apparatus in advance and interpret a type by reading an identifier in input data. For example, the type attribute of an XML schema is an attribute indicating a data type, the encoding apparatus can interpret a type by recognizing the type attribute described in input data.

In step S703, the apparatus determines whether the end condition for grammar learning holds. In this embodiment, a path element, M element, C element, S element, and L element are specified as learning targets. As for the M element grammar, when an end element of the M element is input, the apparatus determines that the end condition holds. When the value of the x or y attribute of the M element is input, since the M element has not ended, the apparatus determines that the end condition does not hold. Likewise, as for a path grammar, when an end element of the path element is input, the apparatus determines that the end condition holds. It is also possible to specify a predetermined data size as a threshold for the data size of a learned grammar. In this case, when the data size of the learned grammar exceeds the predetermined data size, the apparatus may determine the end of learning.

Upon determining in step S703 that the end condition does not hold, the apparatus terminates the processing in FIG. 7. The process then returns to the processing in FIG. 5 and advances to step S504. Upon determining that the end condition holds, the apparatus assigns event codes to the learned grammar in step S704. In this embodiment, the apparatus sequentially assigns event codes "0" and "1" to productions "AT("x")" and "AT("y")", which are added as shown in reference numeral 606 in FIG. 6, in conformity to the specifications of EXI. The productions before addition are assigned event codes obtained by adding additional values to the event codes. In step S705, the apparatus turns on a learning completion flag as indicated by reference numeral 606 to indicate that learning is complete. When the apparatus terminates the processing in FIG. 7, the process returns to the processing in FIG. 5 and advances to step S504. This flag is used to encode input data (to be described later) into EXI data.

In step S504, the apparatus determines whether there is any grammar which is being learned. The above flag indicates whether the grammar is being learned. The apparatus encodes input XML data using the learned grammar. If, therefore, a grammar is being learned, since event codes are not determined, the apparatus needs to store input data until the end of learning. Upon determining that there is a grammar which is being learned, the apparatus stores the input XML data in step S505. Assume that the input data are expected to be encoded in the order of inputting. In this case, upon determining that there is a grammar which is being learned, the apparatus needs to store even input data which is not a learning target. Upon determining in step S504 that there is no grammar which is being learned, the apparatus encodes the temporarily stored data and input XML data by using the learned grammar in step S506.

A decoding apparatus decodes encoded data. EXI schema informed performs decoding processing by creating a grammar from an XML schema in advance as in the case of encoding. Therefore, outputting the grammar learned according to the present invention as an XML schema can perform decoding by using a similar decoding apparatus. In addition, outputting a grammar learned in accordance with the grammar setting format on the decoding apparatus side can perform decoding by using a similar decoding apparatus without via a schema. Therefore, the grammar output unit 417 may be configured to set an output form for the learned grammar and output the learned grammar in the set output form. A case in which a learned grammar is output in the form of a schema as an output form will be described in detail below.

Figure 9:
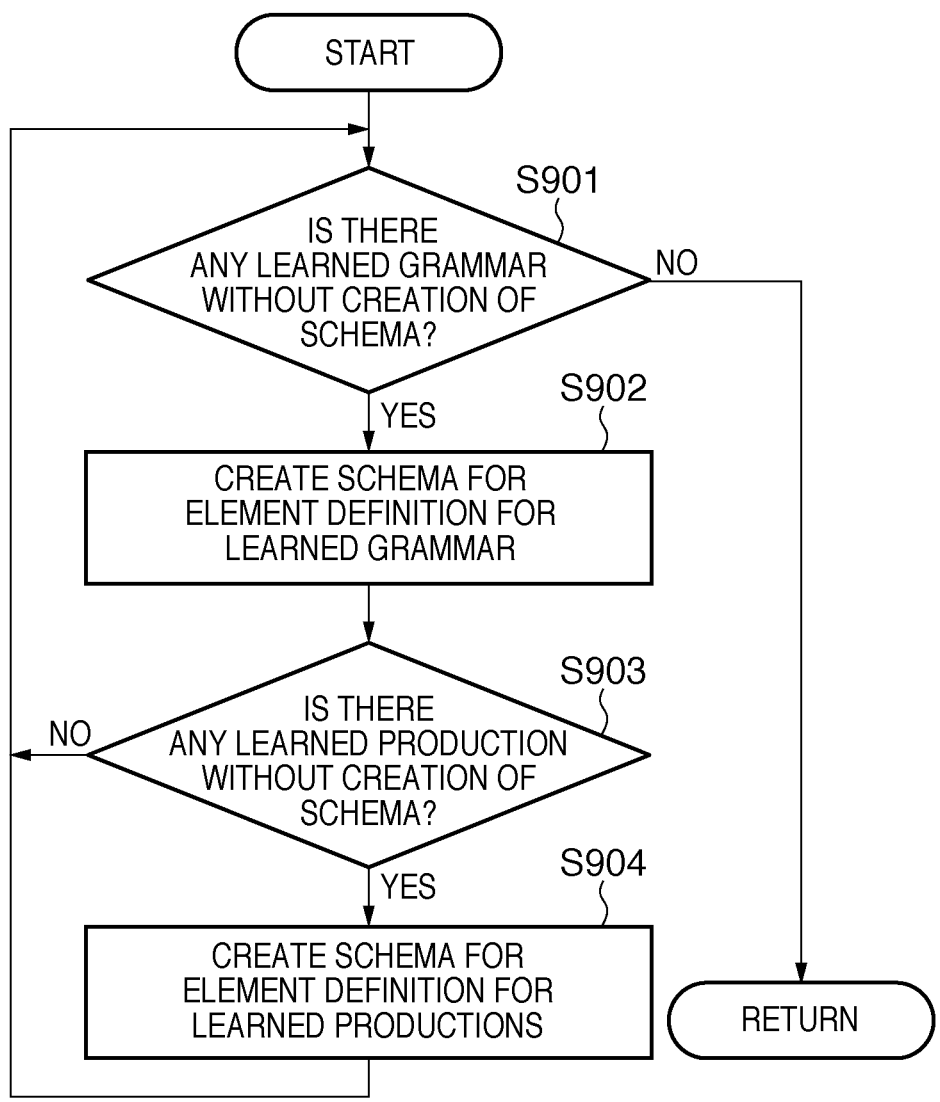
FIG. 9 is a flowchart showing the operation of the information processing apparatus according to the embodiment.

FIG. 8 shows an example of an output XML schema. This embodiment creates a schema by using W3C XML schema. It is possible to create schemas by using other schema languages. FIG. 9 is a flowchart for the creation of a schema. First of all, in step S901, the apparatus determines whether learned grammars include any grammar from which no schema has been created. Upon determining in step S901 that there is such a grammar, the apparatus creates a schema defining learned grammar elements in step S902. In this embodiment, a path element grammar and an M element grammar are schema creation targets. The apparatus therefore creates <xsd: element name="Path" type="pathtype"/> and <xsd: element name="M" type="mtype"/>. Note that "pathtype" and "mtype" are identifiers for reference, and hence the character strings themselves have no meaning.

In step S903, the apparatus determines whether learned productions include any production from which no schema has been created. Upon determining in step S903 that there is such a production, the apparatus creates a schema corresponding to the production and type information as the content of a grammar element in step S904. In this embodiment, the apparatus creates the following descriptions as a double type x attribute and a double type y attribute from the data denoted by reference numerals 606 and 607 in FIG. 6: <xsd: attribute name="x" type="xsd:double"/> and <xsd: attribute name="y" type="xsd:double">. It is possible to create this schema during encoding processing or after the completion of encoding of all the input data.

Second Embodiment

Figure 10:
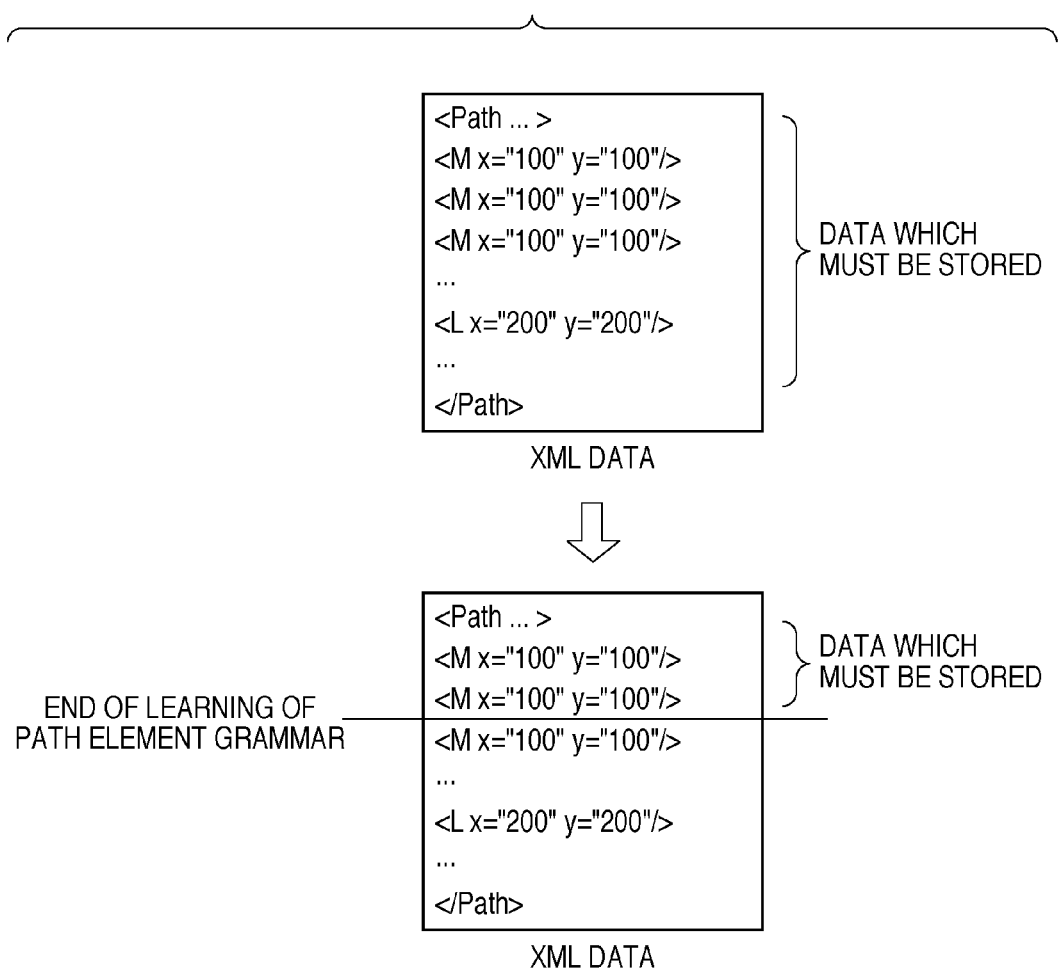
FIG. 10 is a view showing an example of data processed by the information processing apparatus according to an embodiment.

The second embodiment will exemplify a case in which the limit of the size of input data to be stored is specified as a learning condition to allow the present invention to be applied to even a device with a small storage area. FIG. 10 shows an example of XML data to be encoded in this embodiment. In this embodiment, as in the first embodiment, the apparatus specifies a path element, M element, C element, S element, and L element as learning targets. In this case, the apparatus starts learning a path element grammar at the start of data as a path start element, and terminates the learning at the end of data as a path end element. When sequentially performing encoding processing, it is necessary to hold input data which is being learned. It is therefore difficult for a device with a small storage area to encode data. For this reason, when learning conditions for a grammar are specified, a threshold for the size of input data to be stored is set.

Figure 11:
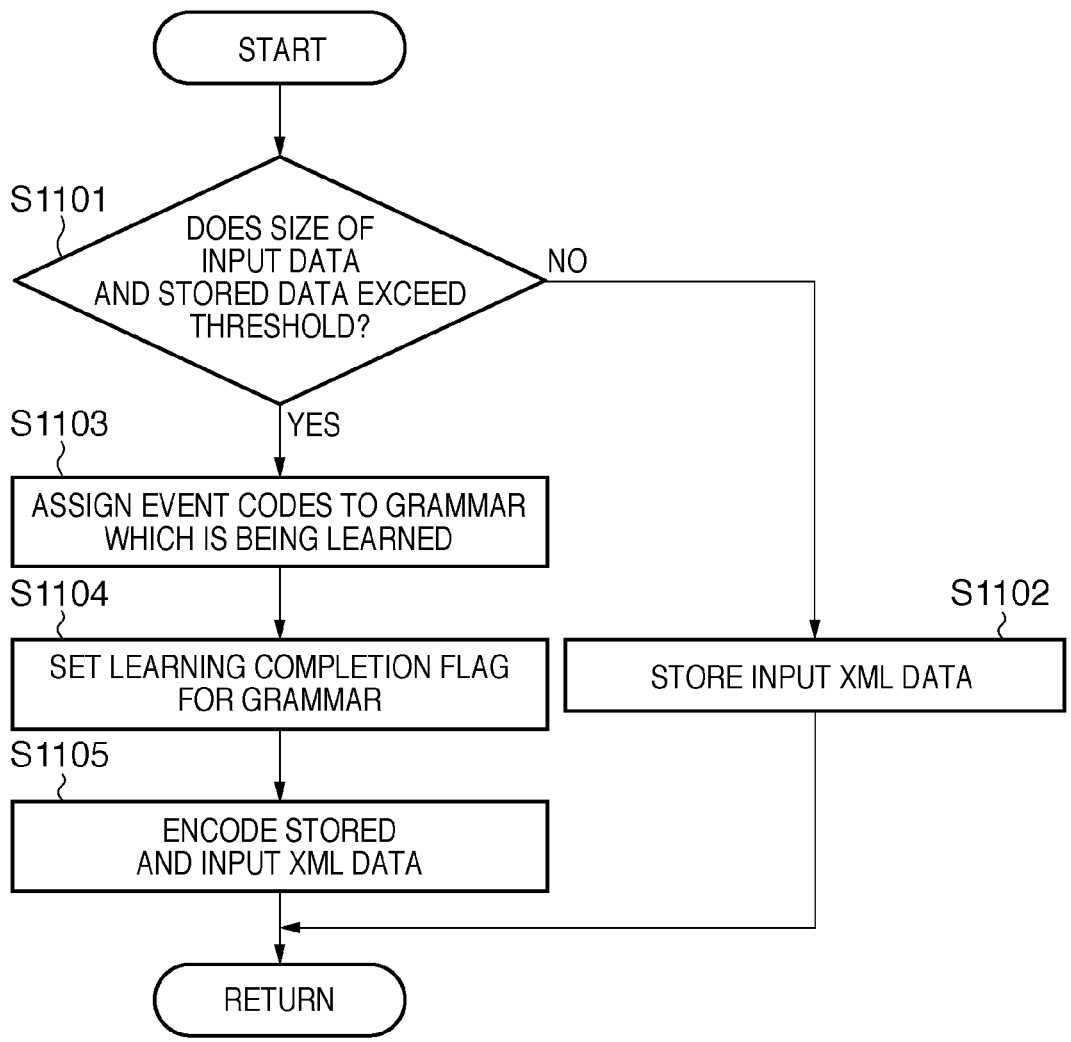
FIG. 11 is a flowchart showing the operation of the information processing apparatus according to the embodiment.

FIG. 11 is a flowchart in this embodiment. In encoding processing, the procedure before step S505 in FIG. 5 is the same as in the first embodiment. When the process advances to step S505, the apparatus determines in step S1101 whether the sum of data which has already been stored and input data exceeds a threshold specified in advance. Upon determining that the sum does not exceed the threshold, the apparatus stores input XML data in step S1102. The process then advances to step S501. Upon determining that the sum exceeds the threshold, the apparatus assigns in step S1103 an event code to a production at the present time in the grammar which is being learned. An event code assigning method to be used is the same as that in the first embodiment. In step S1104, the apparatus sets a grammar learning completion flag to complete learning. Lastly, in step S1105, the apparatus encodes the temporarily stored data and the input XML data in the order of inputting by using the learned grammar. The process then advances to step S501.

With the above processing, when the apparatus completes the learning of the path element grammar with the set threshold, the data which must be stored are only some of the path elements, as shown in FIG. 10. Note however that since the learning of the grammar ends in the middle of the path elements, a schema-invalid production of the grammar is applied to an L element which appears after the end of the learning, as shown in FIG. 10.

Third Embodiment

There is a demand to improve the compression efficiency of each XML instance by using common information called a schema for the purpose of binary XML encoding using the schema. EXI also aims at the implementation of data type adaptive encoding. Data type adaptive encoding is configured to improve compression efficiency by performing encoding adaptive to a data type, for example, encoding integer values into integer type data instead of character string type data.

Figure 12:
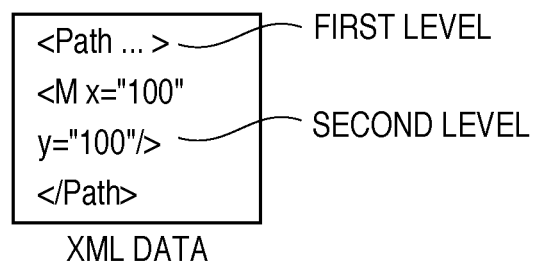
FIG. 12 is a view showing an example of XML data according to the embodiment.

When the only purpose is to implement the latter data type adaptive encoding, it is sometimes required to create a schema informed grammar for only data other than character string type data, in consideration of processing cost and grammar size. The first embodiment specifies learning targets with element names. In contrast, the third embodiment specifies learning targets with the numbers of levels. In the XML data in FIG. 12, the values of the x and y attributes use data other than character string type data. These attributes belong to the element at the second level counted from the root element. Therefore, the number of levels "2" is specified. This makes the M element with the number of levels "2" become a grammar learning target in step S502 in FIG. 5. In step S503, the apparatus learns the grammar. As in the first embodiment, the apparatus creates the grammar shown in FIG. 6, thus efficiently encoding the data into binary XML data.

Fourth Embodiment

The following embodiment will exemplify a case in which grammar learning targets are specified in accordance with selection by the user.

Figure 13:
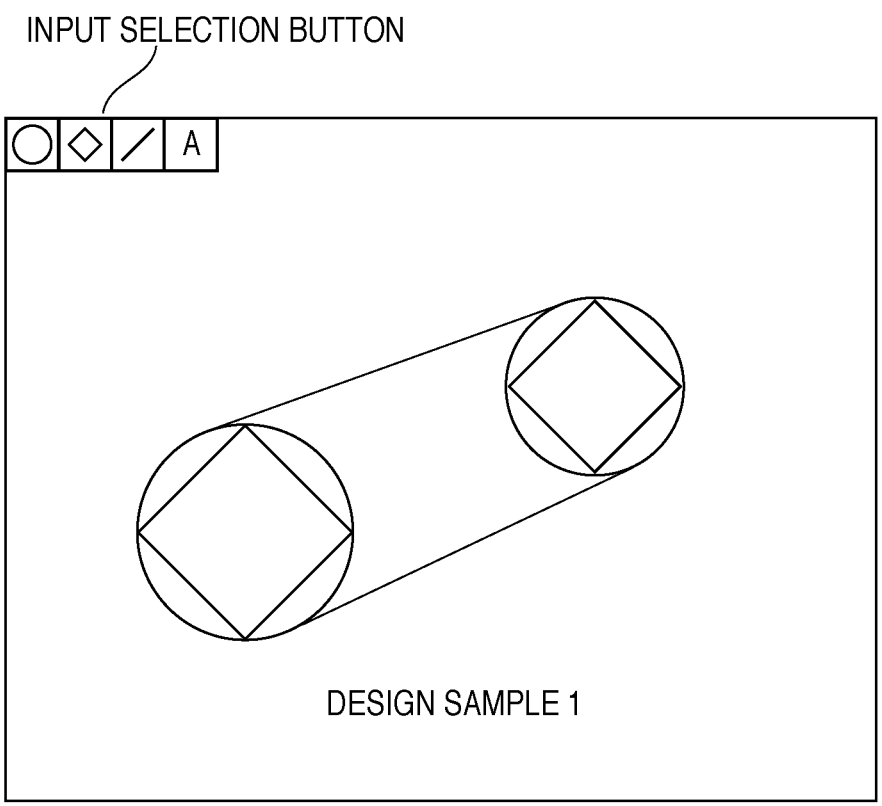
FIG. 13 is a view showing an example of the display screen of a drawing design tool in the embodiment.
Figures 14, 15:
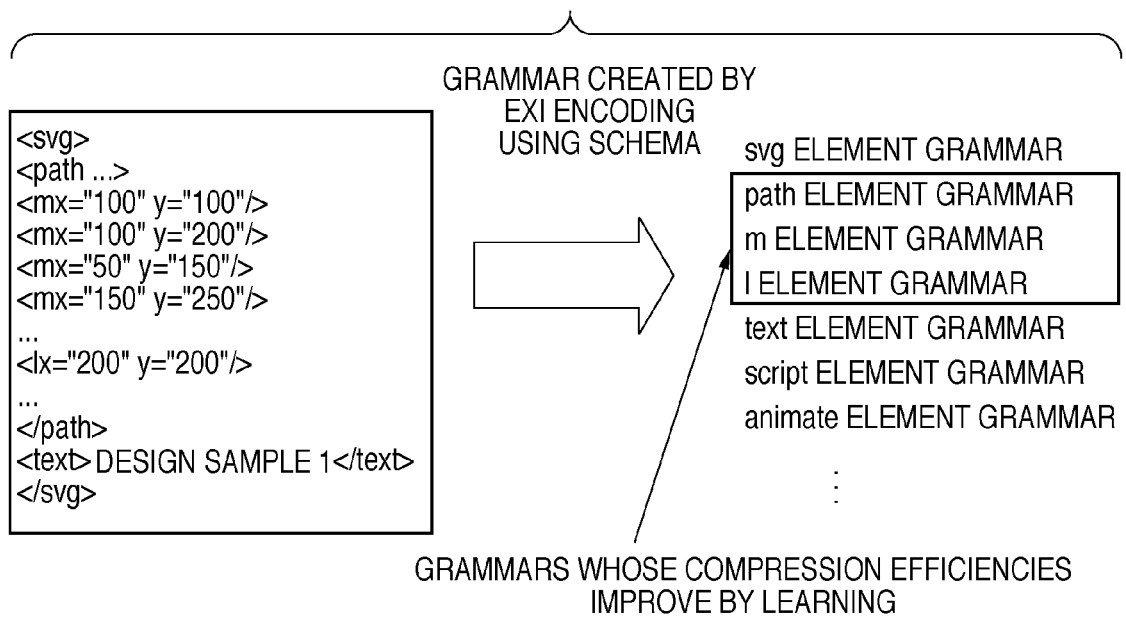
FIG. 14 is a view for explaining the compression of a grammar by learning.
FIG. 15 is a view for explaining the operation of counting the number of times of inputting of each drawing data to specify a learning target in the embodiment.

As shown in FIG. 13, the user performs drawing design by using a tool. The user then converts the designed drawing result into, for example, data in an XML format and stores it. FIG. 14 shows the result obtained by converting the drawing result in FIG. 13 into XML data. Graphical portions such as the circle and rectangle shown in FIG. 13 are described in the path element. A text portion is described in the text element. Assume that this embodiment can further convert the data into data based on EXI which is an XML binary encoding scheme. Encoding data into EXI data using a schema is higher in compression efficiency than encoding without using any schema. This technique, however, creates grammars for tags which do not appear in the XML data in FIG. 14, like the script element and animate element shown in FIG. 14. In addition, the technique creates grammars for tags which dot not recur and hence exhibit small compression effects, like the svg element and the text element.

As shown in FIG. 15, therefore, the tool counts the number of times of inputting of each drawing data such as graphical data or character data. Since the tool converts each input drawing data to a predetermined SVG tag, it is possible to predict that the number of times of inputting of drawing data will be equal to the occurrence number of a given SVG tag. When exporting data to EXI, this technique selects input drawing data whose numbers of times counted are large, specifies corresponding SVG tags, and specifies them as learning targets. This embodiment selects the input drawing data of a circle, rectangle, and straight line and specifies a path element, m element, and l element as learning targets. When encoding data into EXI data, this technique creates grammars by learning only the specified path element, m element, and l element. The learning and creating methods in this case are the same as those in other embodiments.

This generates grammars for only tags which are frequently used, and hence can reduce the amount of memory used for encoding and decoding without decreasing the compression efficiency.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288418, filed Dec. 18, 2009, which is hereby incorporated by reference herein in its entirety.

What is claimed is:

1. An information processing apparatus which encodes input structured data according to an encoding rule, the apparatus comprising:

a specifying unit configured to specify a learning target for the encoding rule;

a start determination unit configured to determine a start of learning of the encoding rule when the input structured data matches a learning target specified by said specifying unit;

a learning unit configured to learn the encoding rule by recognizing a structure and data type of the structured data when said start determination unit determines a start of learning;

an end determination unit configured to determine an end of learning of the encoding rule when an end condition corresponding to a learning target specified by said specifying unit holds for the input structured data;

a storage unit configured to store the structured data until said end determination unit determines an end of learning, wherein the end determination unit further determines an end of learning, when a sum of a data size of the input structured data and a data size of structured data stored in the storage unit exceeds a predetermined data size; and an encoding unit configured to encode the structured data stored in said storage unit according to the encoding rule learned by said learning unit when said end determination unit determines an end of learning.

2. The apparatus according to claim 1, further comprising an output unit configured to output the encoding rule learned by said learning unit after an end of learning.

3. The apparatus according to claim 2, wherein said output unit includes a unit configured to set an output form of the encoding rule learned by said learning unit, and outputs the encoding rule learned by said learning unit in the set output form.

4. The apparatus according to claim 1, wherein said specifying unit specifies an element name as a learning target for the encoding rule, and said start determination unit determines a start of learning, when an element name of the input structured data matches the element name specified by said specifying unit.

5. The apparatus according to claim 1, wherein said learning unit includes a unit configured to estimate a data type of the structured data.

6. The apparatus according to claim 1, wherein said learning unit includes a unit configured to interpret a data type from a type attribute described in the structured data.

7. The apparatus according to claim 1, wherein the structured data comprises XML data.

8. The apparatus according to claim 1, wherein said encoding unit encodes the structured data stored in said storage unit into EXI (Efficient XML Interchange) data according to the encoding rule learned by said learning unit.

9. A control method for an information processing apparatus which encodes input structured data according to an encoding rule, the method comprising:

a specifying step of specifying a learning target for the encoding rule;

a start determination step of determining a start of learning of the encoding rule when the input structured data matches a learning target specified in the specifying step;

a learning step of learning the encoding rule by recognizing a structure and data type of the structured data when a start of learning is determined in the start determination step;

an end determination step of determining an end of learning of the encoding rule when an end condition corresponding to a learning target specified in the specifying step holds for the input structured data;

a storage step of storing the structured data until an end of learning is determined in the end determination step, wherein said end determination step further determines an end of learning, when a sum of a data size of the input structured data and a data size of structured data stored in the storage step exceeds a predetermined data size; and an encoding step of encoding the structured data stored in the storage step according to the encoding rule learned in the learning step when an end of learning is determined in the end determination step.

10. A non-transitory computer-readable storage medium storing a program for causing a computer to function as each unit of an information processing apparatus defined in claim 1.

* * * * *